United States Patent
Wohlert et al.

(10) Patent No.: US 9,325,796 B2
(45) Date of Patent: Apr. 26, 2016

(54) SYSTEM AND METHOD OF DEVICE CAPABILITY SIGNALING

(71) Applicant: AT&T Intellectual Property I, L.P., Atlanta, GA (US)

(72) Inventors: Randolph Wohlert, Austin, TX (US); James H. Pratt, Round Rock, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 14/841,168

(22) Filed: Aug. 31, 2015

(65) Prior Publication Data

US 2015/0381745 A1 Dec. 31, 2015

Related U.S. Application Data

(63) Continuation of application No. 13/633,947, filed on Oct. 3, 2012, now Pat. No. 9,154,558.

(51) Int. Cl.
G06F 15/16 (2006.01)
H04L 29/08 (2006.01)
H04W 4/02 (2009.01)
H04W 4/20 (2009.01)

(52) U.S. Cl.
CPC ............ *H04L 67/16* (2013.01); *H04L 67/1044* (2013.01); *H04W 4/028* (2013.01); *H04W 4/20* (2013.01)

(58) Field of Classification Search
CPC ...................................................... H04L 67/16

USPC .......................................................... 709/206
See application file for complete search history.

(56) References Cited

U.S. PATENT DOCUMENTS

| | | |
|---|---|---|
| 5,832,381 A | 11/1998 | Kauppi |
| 6,985,747 B2 | 1/2006 | Chithambaram |
| 7,254,406 B2 | 8/2007 | Beros et al. |
| 7,606,562 B2 | 10/2009 | Aaltonen et al. |
| 7,911,335 B1 | 3/2011 | Brady, Jr. |
| 8,680,985 B2 | 3/2014 | Brady, Jr. et al. |
| 8,825,873 B2 | 9/2014 | Kumar et al. |
| 2002/0006788 A1 | 1/2002 | Knutsson et al. |
| 2004/0219932 A1 | 11/2004 | Verteuil |
| 2007/0293207 A1 | 12/2007 | Guedalia et al. |
| 2008/0132251 A1 | 6/2008 | Altman et al. |
| 2008/0201748 A1 | 8/2008 | Hasek et al. |
| 2009/0178113 A1 | 7/2009 | Denny et al. |
| 2009/0316690 A1 | 12/2009 | Kim et al. |
| 2010/0035633 A1 | 2/2010 | Park et al. |
| 2010/0062746 A1 | 3/2010 | Proctor et al. |
| 2010/0082761 A1 | 4/2010 | Nguyenphu et al. |
| 2010/0093379 A1 | 4/2010 | Neely et al. |
| 2012/0131095 A1 | 5/2012 | Luna et al. |
| 2013/0029693 A1 | 1/2013 | Bradley, Jr. et al. |
| 2014/0022328 A1 | 1/2014 | Gechter et al. |

*Primary Examiner* — Hamza Algibhah
(74) *Attorney, Agent, or Firm* — Toler Law Group, PC

(57) ABSTRACT

A method includes generating a first schedule at a first electronic device associated with a first user. The first schedule is generated based on a first relationship strength of a relationship of the first user and a second user. The method further includes sending, from the first electronic device to a second electronic device associated with the second user, a first capability request. The first capability request is sent based on the first schedule.

20 Claims, 8 Drawing Sheets

SYSTEM AND METHOD OF DEVICE CAPABILITY SIGNALING

PRIORITY CLAIM

This application claims priority from, and is a continuation of U.S. patent application Ser. No. 13/633,947, filed on Oct. 3, 2012, which is incorporated herein by reference in its entirety.

FIELD OF THE DISCLOSURE

The present disclosure is generally related to device capability signaling.

BACKGROUND

In the telecommunications industry, multimedia communication services, such as video share, may not be invoked by a user if the user is unaware that the service is supported by other user devices. Service providers may enable user capability exchange, which enables a user device to signal its capabilities to other user devices. The user device may display capabilities of other user devices associated with the user's contacts, after receiving capabilities information from the contacts' user devices, when the user views the contacts.

One method of discovering device capabilities is by pulling information from another user's device using peer to peer signaling, or by pulling information from a core network server (e.g. a Presence Server). For example, a first user device may send a session initiation protocol (SIP) options message to a second user device, where the SIP options message provides capabilities information associated with the first user device and asks for the second user device's capabilities. The second user device may respond with a SIP options message that identifies the second user device's communication capabilities. The capabilities may then be displayed on the first user device (e.g., in a contact list on an electronic address book). Pulling information from other user devices has the significant disadvantage of requiring the transmission of a large number of SIP options messages between devices. Further, it may not be known when any particular device's capabilities change. The signaling involved to implement such capability exchange may significantly burden a service provider.

DETAILED DESCRIPTION

Figure 1:
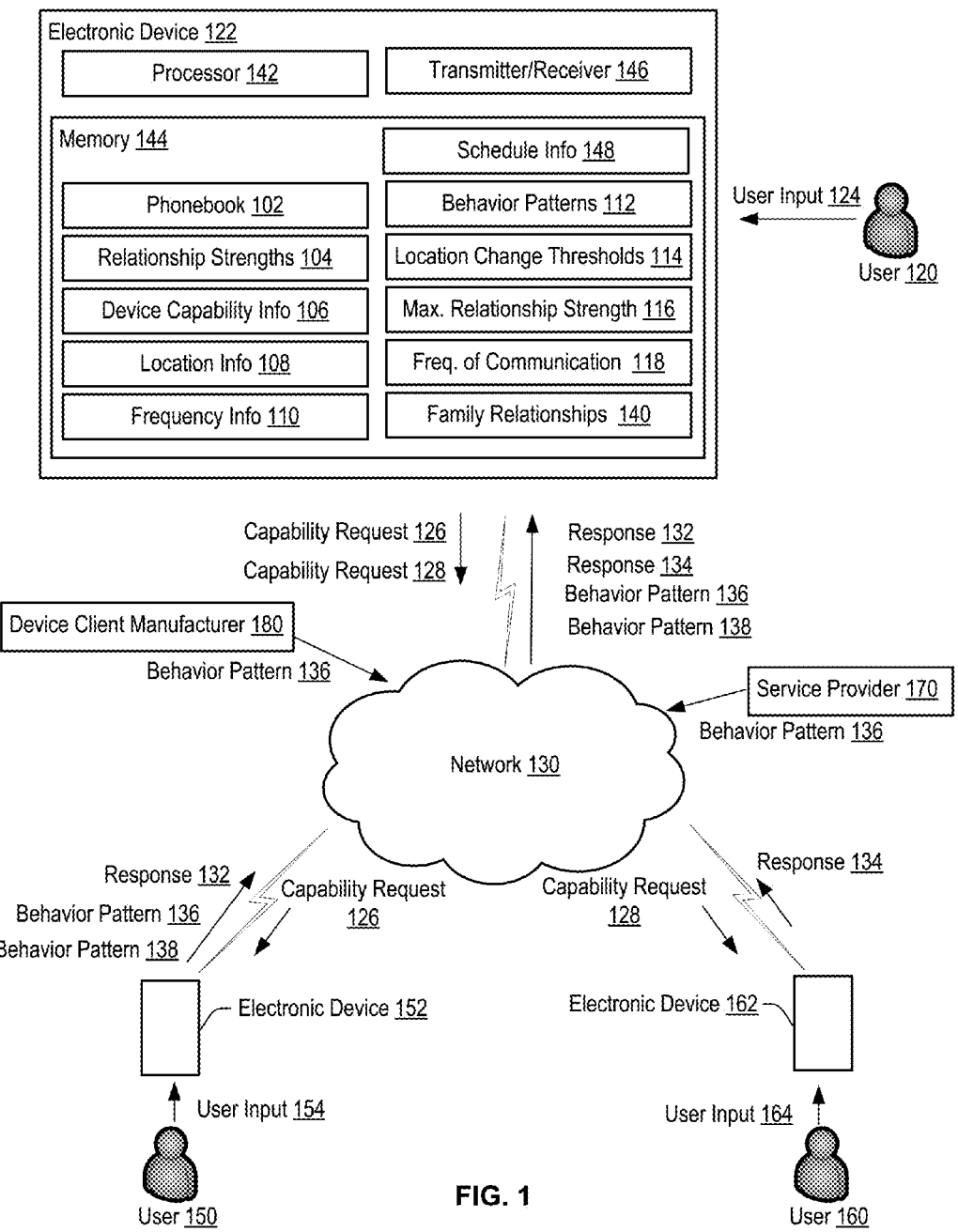
FIG. 1 is a block diagram of a particular illustrative embodiment of a system that is operable to request and receive capability information.

A system and method of prioritizing capability signaling based on relationship strengths and/or behavior patterns is disclosed. The disclosed techniques may send a capability request from a device to another device based on a schedule. The schedule may be based on a relationship strength between a user associated with the device and the user's contact associated with the other device. Alternatively, the relationship strength may be between the device and the contact's device. The schedule may indicate that the capability request is to be sent to the contact's device periodically at a particular frequency. The particular frequency may be based on the relationship strength. For example, when the relationship strength is strong, the schedule may indicate a higher frequency (e.g., the capability request may be sent once an hour). Alternatively, when the relationship strength is weak, the schedule may indicate a lower frequency (e.g., the capability request may be sent once a day). The relationship strength may be based on a frequency of communication between the user's device and the contact's device, a geographical proximity of the devices, a family relationship between the user and the contact, a behavior pattern associated with the contact's device, or any combination thereof). For example, the particular frequency may be based on a behavior pattern of the contact's device, such as a number of times that the contact's device changes locations over a measurement time period or a data activity pattern associated with the contact's device. For example, when the contact's device changes locations frequently (e.g., more than a first location change threshold) during a first measurement time period (e.g., 5:00 PM-7:00 PM on weekdays during the previous week), the capability request may be sent at a higher frequency during a first time period (e.g., 5:00 PM-7:00 PM on a weekday). On the other hand, when the contact's device changes location infrequently (e.g., less than a second location change threshold) during a second measurement time period (e.g., 2:00 AM-5:00 AM on weekdays during the previous week), the capability request may be sent at a lower frequency during a second time period (e.g., 2:00 AM-5:00 AM on a weekday).

In a particular embodiment, a method includes sending, from a first electronic device to a second electronic device, a first capability request based on a first schedule. The first electronic device is associated with a first user and the second electronic device is associated with a second user. A first relationship strength is associated with a relationship of the first user and the second user and the first schedule is based on the first relationship strength. The method also includes sending, from the first electronic device to a third electronic device, a second capability request based on a second schedule. The third electronic device is associated with a third user and a second relationship strength is associated with a relationship of the first user and the third user. The second schedule is based on the second relationship strength and the second relationship strength is different from the first relationship strength.

In another particular embodiment, a computer-readable medium stores instructions that, when executed by a processor, cause the processor to send, from a first electronic device, a first capability request to a second electronic device based on a first schedule during a first time period. The first schedule is based on a first behavior pattern of the second electronic device.

In another particular embodiment, a device includes a processor and a transmitter coupled to the processor. The transmitter is configured to send a capability request to another device based on a schedule. A relationship strength is associated with the other device. The schedule is determined based on the relationship strength and based on a behavior pattern of the other device.

Referring to FIG. 1, a block diagram of a particular illustrative embodiment of a communication system 100 is shown. The communication system 100 includes a first representative electronic device 122 (e.g., a mobile device, a laptop, a cell phone, a tablet computer, a set-top box device, a television, a computing device, etc.) and a network 130. The communication system 100 may also include a second representative electronic device 152 and a third representative electronic device 162. While three electronic devices 122, 152, and 162 are illustrated, it should be understood that the system 100 may involve communication between less than three or more than three electronic devices. In a particular illustrative embodiment, the network 130 includes a distributed wireless network, such as a wide area network or a local area network.

The electronic devices 122, 152, and 162 may communicate according to one or more wireless mobile communication compliant standards including code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, Institute of Electrical and Electronics Engineers (IEEE) 802.11x, or a combination thereof.

The first electronic device 122 may be configured to receive first user input 124 (e.g., contact information, family relationship information, information indicating a willingness to use a service on the first electronic device 122, relationship strength information, location information, etc.) from a first user 120. The second electronic device 152 may be configured to receive second user input 154 from a second user 150. Similarly, the third electronic device 162 may be configured to receive third user input 164 from a third user 160. The network 130 may receive behavior pattern data 136 from various sources. For example, the network 130 may receive the behavior pattern data 136 from a service provider 170 or from a device client manufacturer 180. In a particular illustrative embodiment, the behavior pattern data 136 corresponds to a first number of location changes of an electronic device during a first measurement time. Thus, electronic devices that move frequently during a particular measurement time would have a different behavior pattern than electronic devices that are either in standby mode or otherwise not moving during the particular measurement time.

During operation, the first electronic device 122 may receive the first user input 124 from the first user 120. The first electronic device 122 may include a processor 142 and a memory 144. The memory 144 may include data and applications. In the example of FIG. 1, the memory 144 includes schedule information 148, a phonebook 102, relationship strengths data 104, device capability information 106, location information 108, frequency information 110, behavior patterns data 112, location change thresholds 114, maximum relationship strength 116, frequency of communication data 118, and family relationships data 140. While various data related to behavior or traffic patterns related to users or user devices are illustrated in the memory 144, it should be understood that other data related to actions of the users (or the user devices) may also be included. In a particular embodiment, one or more of the electronic devices 122, 152, and 162 may include mobile devices (e.g., mobile phones, lap top computers, etc.) and the remaining electronic devices may include devices that are generally used at a fixed location (e.g., set-top box devices, desktop computers, televisions, etc.).

The first electronic device 122 may include a transmitter/receiver 146 that is coupled to the processor 142. In a particular illustrative embodiment, the transmitter/receiver 146 may be used instead be a transceiver device. Thus, in a particular embodiment, the first electronic device 122 includes a processor 142, a memory 144, and a receiver 146. The receiver 146 of the first electronic device 122 is coupled to the processor 142. The receiver 146 may be configured to receive the first user input 124 and the behavior pattern data 136. The transmitter 146 is also coupled to the processor 142 and is configured to send to the second electronic device 152 that is associated with the second user 150 a first capability request 126 at times based on a given frequency.

Upon receiving the first user input 124 from the first user 120 (or at another time, such as upon a triggering event (e.g., use of a certain application or power up of the first electronic device 122)), the first electronic device 122 may automatically send the first capability request 126 to the second electronic device 152 associated with the second user 150 based on a first schedule. In a particular illustrative embodiment, the first capability request 126 is a request from the first electronic device 122 to identify capabilities of the second electronic device 152. Examples of capabilities of the second electronic device 152 include, but are not limited to, a device capability for a particular service, a network support for the service, a valid subscription for the service, a willingness of the second user 150 to use the service, or a combination of the foregoing. For example, the second electronic device 152 may be capable of receiving text messages, have network support for receiving text messages, and have a valid subscription for receiving text messages, and the second user 150 may willing to receive text messages on the second electronic device 152. An example of a service includes text messaging, voice, video, group chat, internet browsing, high quality voice, file transfer, thumbnail image display of files, delivery notification, location, global positioning system exchange format (GPX), multimedia messaging service (MMS), short message service (SMS), or a combination thereof. In addition to information related to services, capability information associated with a device may also identify capabilities of the device. For example, certain electronic devices have capability for high speed transmission or display of high definition (HD) content while other electronic devices may have more limited video or transmission capabilities. Such device information may also be communicated or requested by the first capability request 126 and provided as part of a response 132 sent by the second electronic device 152 upon receiving the first capability request 126. In addition to service information and device capabilities, the response 132 may also include format information (e.g., protocol negotiation, data exchange format, authentication, extensible markup language (XML), simple object access protocol (SOAP), hypertext transfer protocol (HTTP)) in terms of preference information with respect to delivery of further communications. The capability requests 126 and 128 may be implemented by sending a session initiation protocol (SIP) options message. While SIP messages may be used, the system 100 is not limited to SIP traffic and may alternatively use other data communication protocols or message options (e.g., extensible markup language (XML), hypertext transfer protocol (HTTP), universal plug and play (UPnP), simple object access protocol (SOAP), transmission control protocol (TCP), internet protocol (IP), wireless fidelity (WiFi), simple service discovery protocol (SSDP), capability discovery protocols, etc.).

In a particular illustrative embodiment, a first schedule indicates that the first capability request 126 is to be sent to the second electronic device 152 with a first frequency (e.g., once every hour). The first schedule may be stored within the schedule information 148 of the memory 144. In a particular illustrative embodiment, a first relationship strength that may be stored within the relationship strengths data 104 of the memory 144 is associated with the second user 150. In particular, the first relationship strength measures a relationship between the first user 120 and the second user 150. As a further example, a strong relationship may indicate a significant level of previous or ongoing communication between the first user 120 and the second user 150 (e.g., communications between close friends). On the other hand, a weak relationship between the first user 120 and the second user 150 may indicate infrequent communications between such users. In a particular embodiment, the frequency of communication between the first user 120 and the second user 150 and between the first user 120 and the third user 160 may be stored in the memory 144, such as by the frequency of communication data 118. The first frequency of sending the first capability request 126 to the second electronic device 152 may be determined at least in part based on the relationship strength of the relationship of the first user 120 and the second user 150. More specifically, the frequency of sending capability requests between users having strong relationships may be greater than the frequency of sending capability requests between users that have weak relationships. In a particular illustrative embodiment, there may be a single relationship strength associated with the second user 150 and the relationship strength may be associated with (e.g., imputed to) each device associated with the second user 150. The first electronic device 122 may send the first capability request 126 to multiple devices associated with the second user 150 (including the second electronic device 152) with a higher frequency (e.g., once per hour) if the relationship strength is strong (e.g., represented by a large integer) and send the first capability request 126 with a lower frequency (e.g., once per day) if the relationship strength is weak (e.g., represented by a small integer). In another particular illustrative embodiment, there may be a separate relationship strength associated with each device of the second user 150. In such an embodiment, capability requests may be sent to different devices of the second user 150 with different frequencies.

The first electronic device 122 may automatically send a second capability request 128 to a third electronic device 162 that is associated with the third user 160. The first electronic device 122 sends the second request 128 based on a second schedule. In a particular illustrative embodiment, the second schedule may indicate that the second capability request 128 is to be sent to the third electronic device 162 with a second frequency. The capability requests 126 and 128 may be implemented by sending a session initiation protocol (SIP) options message. While SIP messages may be used, the system 100 is not limited to SIP traffic and may alternatively use other data communication protocols or message options (e.g., extensible markup language (XML), hypertext transfer protocol (HTTP), universal plug and play (UPnP), simple object access protocol (SOAP), transmission control protocol (TCP), internet protocol (IP), wireless fidelity (WiFi), simple service discovery protocol (SSDP), capability discovery protocols, etc.).

The first schedule and the second schedule may be determined based on the schedule information 148 stored within the memory 144 of the first electronic device 122. The frequency of sending the first capability request 126 and the second capability request 128 may be determined based on the frequency information 110 stored within the memory 144 of the first electronic device 122. A second relationship strength may indicate a strength of a relationship of the first user 120 with the third user 160. In a particular illustrative embodiment, the second relationship strength may be stored within the relationship strengths data 104 of the memory 144. Again, a strong relationship strength may indicate a high volume of traffic, such as significant communication between friends or family, while a weak relationship strength may indicate infrequent communications. An example of a weak relationship strength may be between a user and a professional service provider, such as the user's doctor where communications may be made once or twice a year depending on appointment schedules. In a particular illustrative example, the first relationship strength between the first user 120 and the second user 150 is different than the second relationship strength between the first user 120 and the third user 160. Since the relationship strength between each pair of users is different, the frequency of sending the first capability request 126 and the second capability request 128 is also different. In particular, a stronger relationship strength corresponds to a higher frequency of sending the second capability request 128 (e.g., once per hour), while a weaker relationship strength corresponds to a lower frequency of sending the second capability request 128 (e.g., once per day). Thus, the first electronic device 122 may send capability requests more frequently to an electronic device of a user that the first user 120 communicates with more often and less frequently to an electronic device of a user that the first user 120 communicates with less often. Thus, the overall amount of capability signaling traffic may be reduced, while requesting frequent updates from the electronic devices that the first user 120 may be most interested in communicating with.

When the first electronic device 122 sends the first capability request 126, the first capability request 126 is distributed via the network 130 to the second electronic device 152. The second electronic device 152, in response to receiving the first capability request 126 provides a response 132. Upon receiving the response 132, the first electronic device 122 may store the capability information received in the response 132 in the memory 144, such as in the device capability information 106.

Upon receiving and storing the capability information related to the second electronic device 152, the first electronic device 122 may display such information to the first user 120. The device capability information 106 may be displayed by a user interface of the first electronic device 122. Exemplary information that may be displayed is illustrated with respect to FIG. 4.

The first electronic device 122 may also send a second capability request 128 to the third electronic device 162. In response to receiving the second capability request 128, the third electronic device 162 may provide a representative response 134 that is communicated back to the first electronic device 122. The first electronic device 122 may receive the response 134 from the third electronic device 162 and store the information received in the response 134 in the device capability information 106. The capability information related to the third electronic device 162 may also be displayed by the first electronic device 122. Thus, the device capability information 106 within the memory 144 stores capability information for multiple devices that the first electronic device 122 is capable of communicating with. While only two electronic devices 152 and 162 are illustrated, it should be understood that the first electronic device 122 may communicate with and collect capability information from more than two devices.

In a particular embodiment, the relationship strength associated with the second user 150 or with the second electronic device 152 may also be based, at least in part, on a geographical proximity of the first electronic device 122 and the second electronic device 152. In a particular embodiment, the response 132 may include location information of the second electronic device 152. Similarly, the response 134 may include location information of the third electronic device 162. Location information of the second electronic device 152 and location information of the third electronic device 162 may be stored within the memory 144, such as in the location information 108. When the location information of a particular electronic device changes, the relationship strength associated with a user of the electronic device (or associated with the electronic device) may also change in response to the changed location information. For example, if the second user 150 is initially in a different city or state than the first user 120 and the second user 150 travels to a location close to the first user 120 (e.g., the same city or state as the first user 120), the location information 108 may be updated accordingly. Upon determining that the first and second electronic devices 122 and 152 are more proximate to each other, the relationship strength associated with the second user 150 (or with the second electronic device 152) may be increased based on such information. Thus, the relationship strengths data 104 may be dynamically updated depending on changed circumstances identified by data collected by the first electronic device 122. In order to avoid unnecessary updates to the location information 108, a threshold may be used. In this circumstance, location changes that do not exceed the threshold may not cause an update event to the location information 108 stored within the memory 144. In this manner, minor changes in location that do not affect the relationship strength are not recorded or not acted upon immediately.

Further, the relationship strength associated with the second user 150 (or with the second electronic device 152) may also be based, at least in part, on a family relationship between the first user 120 and the second user 150. In a particular embodiment, the response 132 may include family relationship information with respect to the first user 120 and the second user 150. Similarly, the response 134 may also include family relationship information with respect to the first user 120 and the third user 160. Alternatively, family relationship information may be identified in a different way (e.g., based on the first user 120 and the second user 150 being part of the same family service plan). The family relationship information may be stored in the memory 144, such as in the family relationships data 140. Such family relationship information may be used to initially calculate or to adjust the relationship strengths associated with the second user 150 (or the second electronic device 152) and the third user 160 (or the third electronic device 162). For example, the processor 142 within the first electronic device 122 may identify a family relationship between various users and may increase a score of the relationship between such users and store the increased score in the updated relationship strengths data 104. The family relationships data 140 may be updated based on the first user input 124 and/or the phonebook 102.

In addition to the response 132, the second electronic device 152 may send the behavior pattern data 136 and 138 to the first electronic device 122. In a particular illustrative embodiment, a behavior pattern associated with an electronic device indicates a number of times that the electronic device has changed locations over a time period. If the behavior pattern data 136 indicates that the second electronic device 152 has changed locations a number of times that is greater than a first location change threshold, then the frequency of sending the first capability request 126 may be increased in response. For example, the behavior pattern data 136 may indicate that the number of times the second electronic device changes locations is above the first location change threshold during a first measurement time (e.g., 5:00 PM and 6:00 PM on weekdays). Based on the behavior pattern data 136, the frequency of sending the first capability request 126 to the second electronic device 152 may be higher (e.g., once every 10 minutes) during a first time (e.g., 5:00 PM-6:00 PM on weekdays) than during other times. As another example, the behavior pattern data 136 may indicate that the second electronic device 152 travels from the second user 150's office to a coffee shop and back to the second user 150's office during a short time period (e.g., 5:00 PM and 5:05 PM on weekdays). The time period (i.e., 5 minutes) may be so short that a determination may be made that the first capability request 126 should be sent to the second electronic device 150 before or after the time period (i.e., the frequency of sending the first capability request 126 to the second electronic device 152 is zero during 5:00 PM and 5:05 PM on weekdays). As an additional example, the behavior pattern data 138 may indicate that the number of times that the second electronic device 152 changes locations during a second measurement time (e.g., 10 AM and 11 AM on weekdays) is below a second location change threshold. Based on the behavior pattern data 138, the frequency of sending the first plurality of capability requests to the second electronic device 152 may be low (e.g., once an hour) during a second time (e.g., 10 AM and 11 AM on weekdays).

The first location change threshold and the second location change threshold may be stored in the memory 144, such as within the location change thresholds 114. The location change thresholds 114 may have default values, values received via the first user input 124, automatically generated values based on a user-specified criteria (e.g., a maximum or minimum number of capability requests that may be sent during a time period), or any combination thereof. For example, the first location change threshold may be automatically lowered in response to determining that a total number of capability requests sent by the first electronic device 122 during a given time period is below a minimum number of capability requests that the first electronic device 122 may send during the time period. The frequency of sending a capability request may increase in response to the decreased first location change threshold because there may be an increased likelihood that the number of times that the second electronic device 152 changes locations is above the first location change threshold. Similarly, the first location change threshold may be automatically raised in response to determining that the total number of capability requests sent by the first electronic device 122 during the given time period is above the maximum number of capability requests that the first electronic device 122 may send during the time period. The minimum and maximum number of capability requests that the first electronic device 122 may send over a time period may be stored in the memory 144, such as in the frequency information 110. While a behavior pattern indicating the number of times a particular electronic device changes locations is described, it should be understood that a behavior pattern may indicate a number of times a user changes locations based on location information of multiple devices associated with the same user and that the user's behavior pattern may be compared to a threshold to determine a frequency of sending a capability request to a particular device associated with the user. For example, the second user 150 may change a first number of locations with the second electronic device 152 (e.g., while driving home from work with a car phone) and change a second number of locations with another electronic device (e.g., while riding a bike with a mobile device after reaching home). The behavior pattern data 136 and 138 may be stored in the memory 144, such as in the behavior patterns data 112.

In a particular illustrative embodiment, the second user 150 and the third user 160 are represented by contacts in the phonebook 102. In a particular embodiment, the phonebook 102 is stored within the memory 144 of the first electronic device 122. Alternatively, the phonebook 102 (as well as other data, such as the schedule information 148, relationship strengths data 104, device capability information 106, location information 108, frequency information 110, behavior patterns data 112, location change thresholds 114, maximum relationship strength 116, frequency of communication data 118, and/or family relationships data 140) may be stored at a device other than the first electronic device 122, but phonebook records (and other data) may be accessible by the first electronic device 122. For example, the first electronic device 122 may access, via the network 130 or another network, a network stored phonebook 102 that includes contact information. An example of such an approach would be a cloud based service that maintains data for the first user 120. While capability signaling between electronic devices associated with different users is illustrated, it should be understood that the first electronic device 122 may communicate with and collect capability information from other devices associated with the first user 120.

In a particular embodiment, the relationship strengths data 104 is a positive number that is less than or equal to the maximum relationship strength 116. For example, if a relationship strength associated with the second user 150 matches the maximum relationship strength 116 (e.g., maximum relationship strength of 24), a frequency of sending the first capability request 126 may be 24 times per day (hourly). As another example, if the relationship strength associated with the second user 150 is 12 and the maximum relationship strength 116 is 24, then the frequency of sending the first capability request 126 may be every other hour. In a similar manner, if the relationship strength associated with the second user 150 is 1 and the maximum relationship strength 116 is 24, then the first capability request 126 may be sent once per day. As another example, the maximum relationship strength 116 may be equal to 10. The frequency of sending the first capability request 126 to the second electronic device 152 may be 12 times a day (e.g., once every two hours) if the relationship strength associated with the second user 150 is 5 and 2.4 times a day (e.g., once every 10 hours) if the relationship strength associated with the second user 150 is 1. Thus, the relationship strength associated with a user and the maximum relationship strength 116 may be related in a manner that may be used by the processor 142 in order to determine the frequency information 110 for transmission frequencies of the capability requests 126 and 128.

Figure 2:
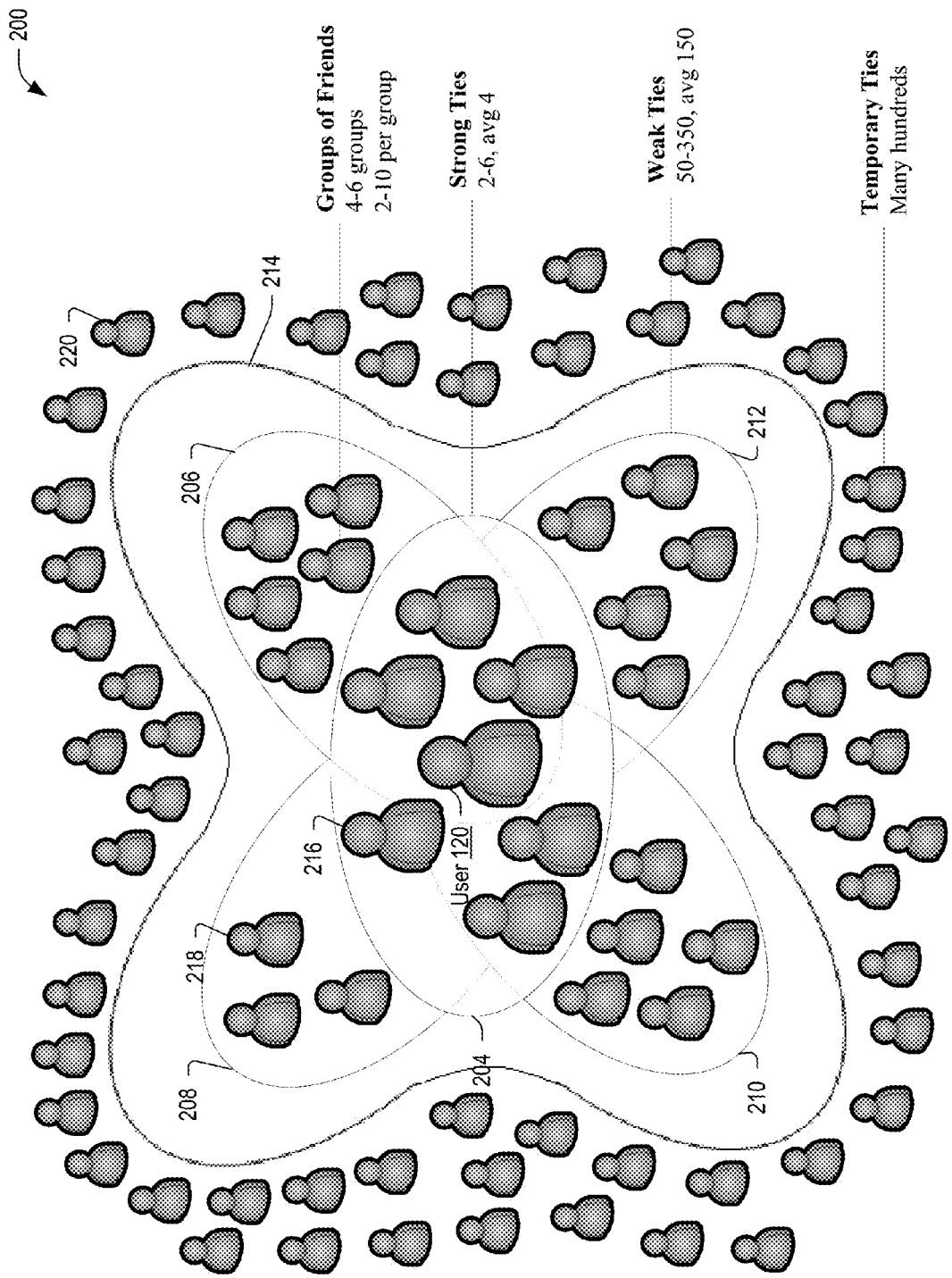
FIG. 2 is a diagram to illustrate a particular example of a social network of a user of the system of FIG. 1.

Referring to FIG. 2, a diagram of a particular example of a social network of a user of the system of FIG. 1 is shown and is generally designated 200. FIG. 2 depicts various relationships for the first representative user 120. The social network 200 includes groups 204, 206, 208, 210, 212, and 214. The first user 120 has strong ties within the group 204. For example, the relationship strengths between the user and each of the other users within the group 204 may be high (e.g., between 20 and 24, where the maximum relationship strength 116 is 24). The groups 206, 208, 210, and 212 overlap with the group 204 and also include additional users that are not members of the group 204. For example, the group 206 may include neighbors, the group 208 may include school friends, the group 210 may include work friends, and the group 212 may include relatives of the first user 120. A few of the members of the groups 206, 208, 210, and 212 may be included within the group 204. For example, the first user 120 may have stronger ties with some (e.g., between 2 and 6 users with an average of 4) of the neighbors, school friends, work friends, and relatives. The first user 120 has weak ties with the remaining users (e.g., between 50 and 350 users, with an average of 150) within the groups 206, 208, 210, and 212. The first user 120 has weak temporary ties with the users (e.g., many hundreds) outside the group 214 (i.e., users not within groups 206, 208, 210, and 212). The relationship strength between the first user 120 and the users in the group 204 may be higher than the relationship strength between the first user 120 and the users outside the group 214. The relationship strength may be based on a frequency of communication, a family relationship, a geographical proximity, a behavior pattern, or any combination thereof, as explained with reference to FIG. 1.

The frequency of sending a capability request from the first electronic device 122 to a device associated with each of the other users in the social network 200 may be based on the relationship strength between the first user 120 and each of the other users, as explained with reference to FIG. 1. For example, based on the relationship strengths, the frequency of sending a capability request may be high between the first electronic device 122 and each of the devices associated with the users in group 204. The frequency of sending a capability request may be medium between the first electronic device 122 and each of the devices associated with the users in groups 206, 208, 210, and 212 who are not included in the group 204. The frequency of sending a capability request may be low between the first electronic device 122 and each of the devices associated with the users that are outside the group 214. For example, the frequency of sending a capability request may be once an hour between the first electronic device 122 and each of the devices associated with the users in group 204 whereas the frequency of sending capability request to each of the devices associated with the users in groups 206, 208, 210, and 212 who are not included in the group 204 may be twice a day. The frequency of sending a capability request to devices associated with the users that are outside the group 214 may be once a day.

Thus, the first user 120 may have strong ties with a small number of users (e.g., an average of 4) compared to all of the users (e.g., many hundreds) in the first user 120's social network 200. Sending more frequent capability requests to a small number of users and less frequent capability requests to a much larger number of users may reduce overall signaling traffic while keeping the first user 120 up to date on the capability information that may be of most interest to the first user 120 (i.e., capability information related to users that the first user 120 has strong ties with).

Figure 3:
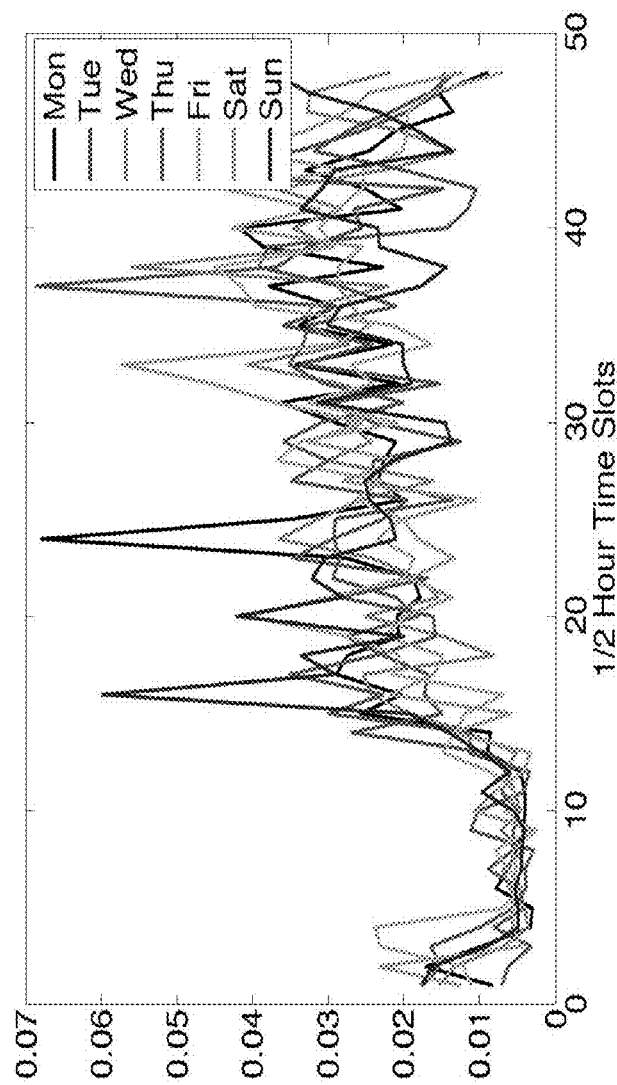
FIG. 3 is a diagram to illustrate a particular example of behavior patterns of users of the system of FIG. 1.

Referring to FIG. 3, a diagram of a particular example of behavior patterns of users of the system of FIG. 1 is shown and is generally designated 300. FIG. 3 illustrates a time of day/day of week data download activity of college students. A user's behavior may typically follow a diurnal pattern with distinct spikes in behavior during certain times of the day. For example, the behavior patterns 300 illustrated in FIG. 3 show that user activity is low between the hours of approximately 2:30 AM and 5:00 AM, whereas user activity is high during the daytime hours. The user activity may be determined based on the user's activity on a single device or may be an aggregate of the user's activity on multiple devices (e.g., a mobile phone, a work phone, a work computer, a television at home, a set-top box device at home, a laptop, a game console, etc.). The frequency of sending a capability request from the first electronic device 122 to a device associated with a user may be based on the user's behavior patterns (or the device's behavior patterns), as explained with reference to FIG. 1. For example, during the daytime hours the capability request may be sent at a higher frequency (e.g., twice an hour) and between 2:30 AM and 5:00 AM the capability request may be sent at a lower frequency (e.g., once every two hours). Thus, the first electronic device 122 may send capability requests more frequently during the hours when the capability information is more likely change and less frequently during the hours when the capability information is less likely to change. Determining the frequency of sending a capability request to a device based on a behavior pattern associated with the device (or with a user of the device) may reduce the capability signaling traffic while keeping the first electronic device 122 up to date on capability information associated with the device.

Figure 4:
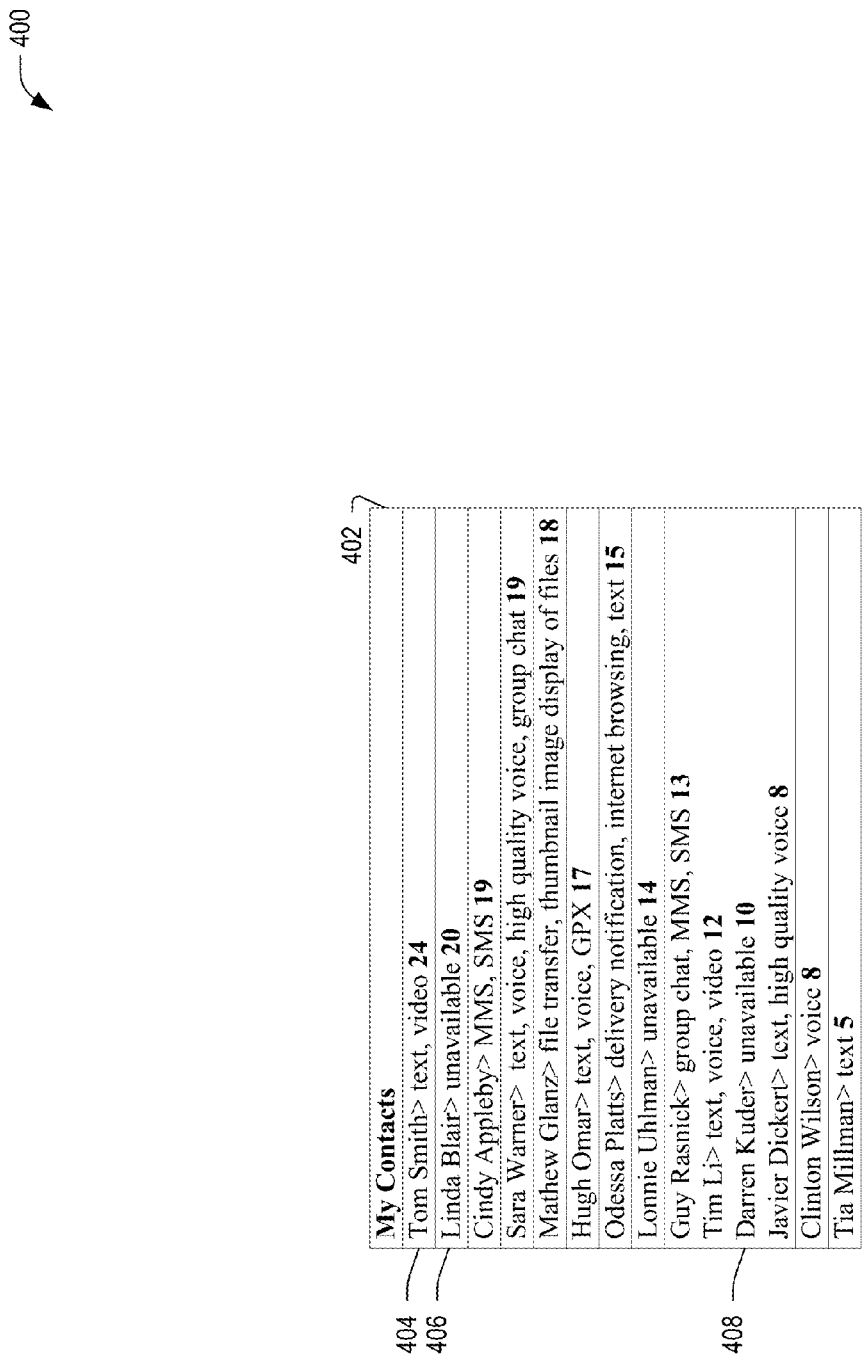
FIG. 4 is a diagram to illustrate a particular example of a user interface that may be displayed by a device of the system of FIG. 1.

Referring to FIG. 4, a diagram of a particular example of a user interface that may be displayed by a device of the system of FIG. 1 is shown and is generally designated 400. The user interface 400 may display contact information, capability information, relationship strength, as well as other information (e.g., family relationship) associated with contacts of the first user 120. For example, the user interface 400 displays that an electronic device of a contact 'Tom Smith' is capable of communicating via text and video and that there is a relationship strength of 24 associated with the contact 'Tom Smith'. In an alternative embodiment, the relationship strength information may not be displayed and the process of varying the frequency of capability requests based on relationship strength described herein may be transparent to the first user 120. In a particular embodiment, the user interface 400 may acquire contact information from the phonebook 102 of FIG. 1. The user interface 400 may acquire the capability information from the device capability information 106 and the relationship strength from the relationship strengths data 104.

The user interface 400 may display that a contact is unavailable. For example, the user interface 400 shows that a contact 'Linda Blair' is unavailable and that the relationship strength associated with the contact 'Linda Blair' is 20. The user interface may display contacts ordered based on the contacts' relationship strengths. For example, the user interface 400 displays the contact 'Tom Smith' with a relationship strength of 24 before the contact 'Linda Blair' with a relationship strength of 20. The first electronic device 122 may update a relationship strength associated with a contact based on the first user input 124 received from the first user 120. For example, the user interface 400 displays that the contact 'Tia Millman' has a relationship strength of 5. The first user 120 may provide the first user input 124 to the first electronic device 122 to update the relationship strength (e.g., to increase or decrease the relationship strength).

Figure 5:
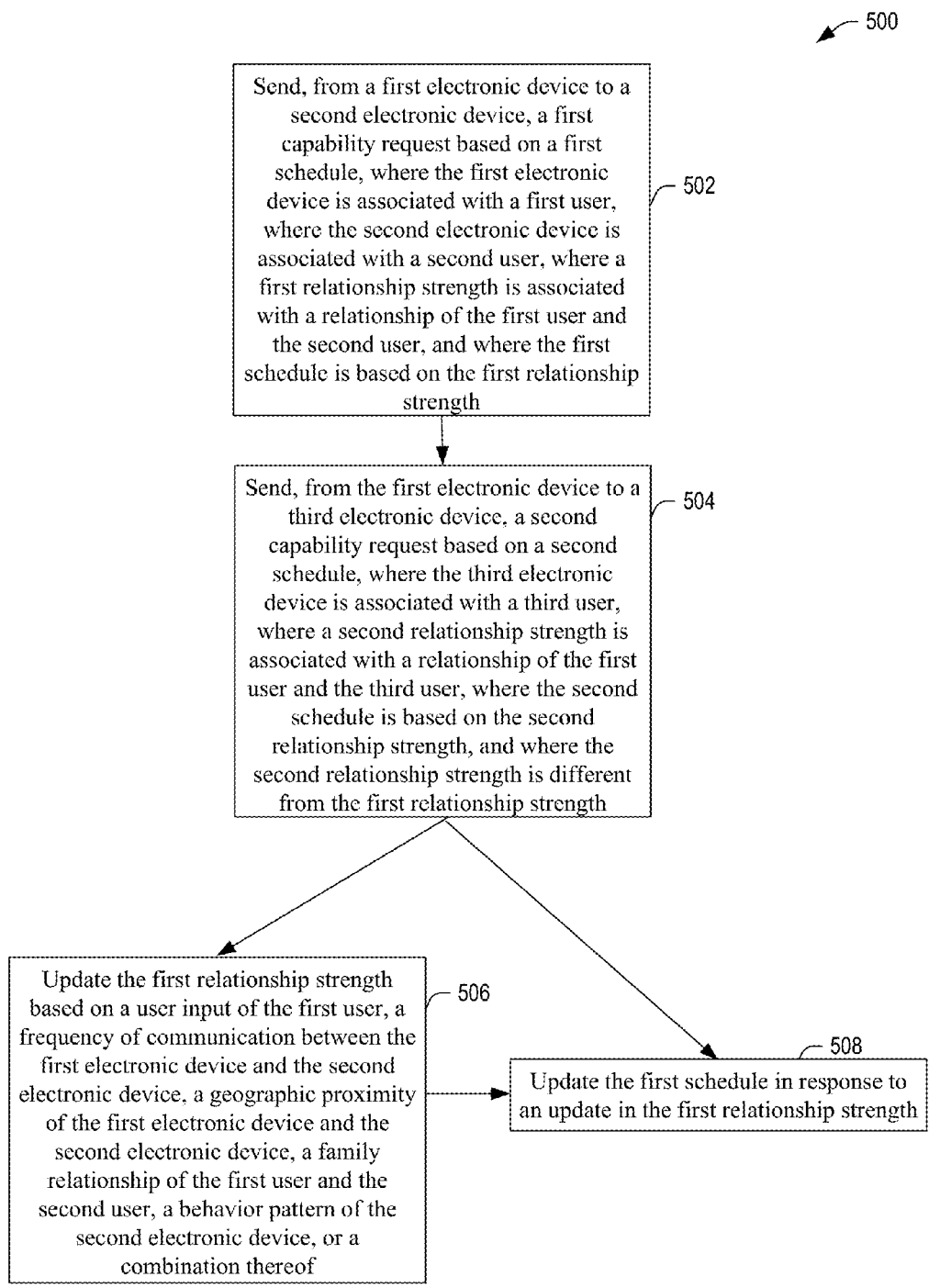
FIG. 5 is a flowchart to illustrate a particular embodiment of a method of sending capability requests to a device.

FIG. 5 is a flowchart to illustrate a particular embodiment of a method 500 of sending capability requests to a device. In an illustrative embodiment, the method 500 may be performed by the system 100 of FIG. 1 and illustrated with reference to FIGS. 2-4.

The method 500 may include sending, from a first electronic device to a second electronic device, a first capability request based on a first schedule, where the first electronic device is associated with a first user, where the second electronic device is associated with a second user, where a first relationship strength is associated with a relationship of the first user and the second user, and where the first schedule is based on the first relationship strength, at 502. For example, in FIG. 1, the first electronic device 122 may automatically send a first capability request 126 to the second electronic device 152 based on a first schedule. In a particular embodiment, the first schedule may indicate that the first capability request 126 is to be sent periodically with a first frequency. A first relationship strength may be associated with the second user 150 and the first frequency may be determined based on the first relationship strength. For example, the second user 150 may be represented by the contact 'Tom Smith' of FIG. 4 and have an associated relationship strength of 24. The first electronic device 122 may send the first capability request 126 at a first frequency (e.g., once per hour) based on the first relationship strength.

The method 500 may also include sending, from the first electronic device to a third electronic device, a second capability request based on a second schedule, where the third electronic device is associated with a third user, where a second relationship strength is associated with a relationship of the first user and the third user, where the second schedule is based on the second relationship strength, and where the second relationship strength is different from the first relationship strength, at 504. For example, in FIG. 1, the first electronic device 122 may automatically send a second capability request 128 to the third electronic device 162 based on a second schedule. In a particular embodiment, the second schedule may indicate that the second capability request 128 is to be sent with a second frequency. A second relationship strength may be associated with the third user 160 and the second frequency may be determined based on the second relationship strength. For example, the third user 160 may be represented by the contact 'Tim Li' of FIG. 4 and have an associated relationship strength of 12. The first electronic device 122 may send the second capability request at a second frequency (e.g., once every two hours) based on the second relationship strength.

The method 500 may further include updating the first relationship strength based on a user input of the first user, a frequency of communication between the first electronic device and the second electronic device, a geographic proximity of the first electronic device and the second electronic device, a family relationship of the first user and the second user, a behavior pattern of the second electronic device, or a combination thereof, at 506. For example, in FIG. 1, the first relationship strength associated with the second user 150 may be updated based on the first user input 124. In a particular embodiment, the first user 120 and the second user 150 may initially be unrelated. The family relationship associated with the second user 150 may be updated based on the first user input 124 indicating that the second user 150 has married a sibling of the first user 120. In response to a change in the family relationship, the relationship strength associated with the second user 150 may be increased.

Alternatively, or in addition, the method 500 may also include updating the first schedule in response to an update in the first relationship strength, at 508. For example, in FIG. 1, the first relationship strength associated with the second user

150 may be updated. In a particular embodiment, the first schedule of sending the first capability request 126 to the second electronic device 152 may be updated in response to a change in the first relationship strength. For example, the first schedule may indicate that the first capability request 126 is to be sent to the second electronic device 152 with a higher frequency (e.g., once an hour instead of once a day) based on an increase in the first relationship strength.

Figure 6:
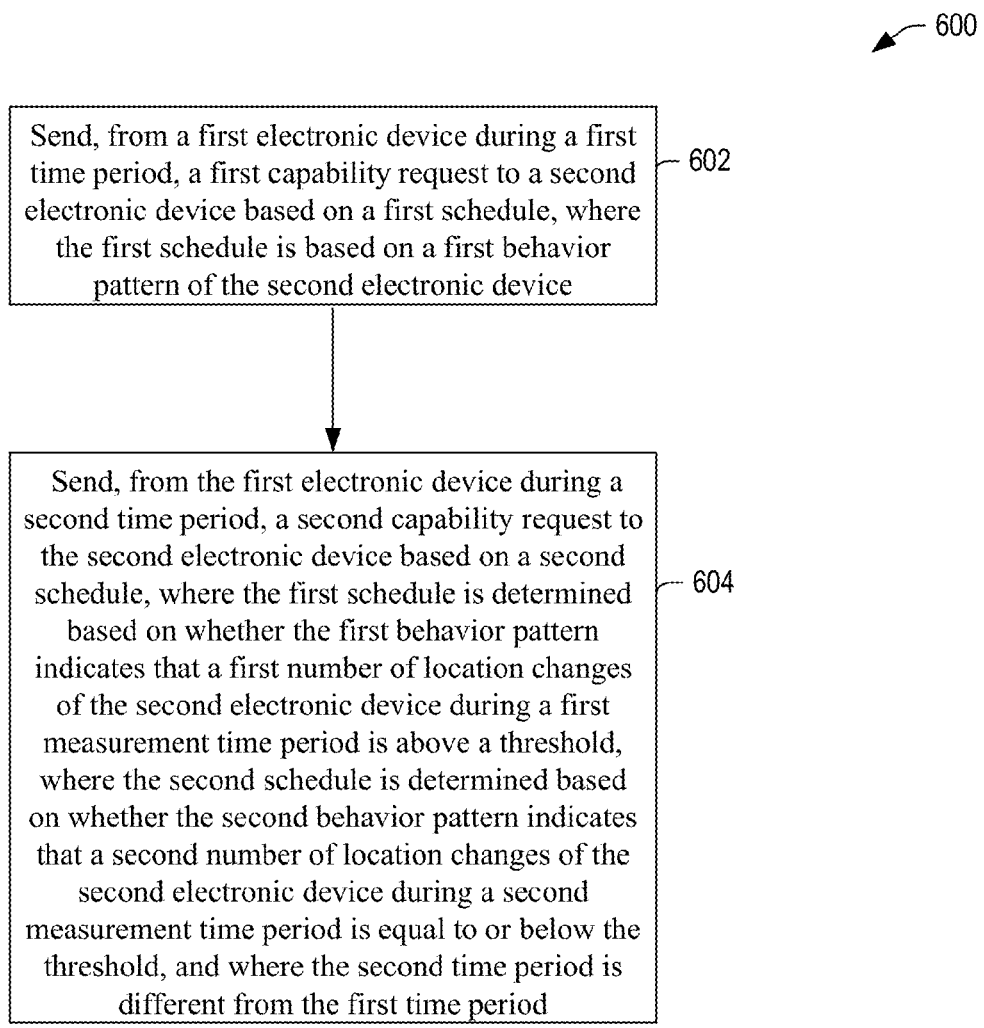
FIG. 6 is a flowchart to illustrate another particular embodiment of a method of sending capability requests to a device.

FIG. 6 is a flowchart to illustrate another particular embodiment of a method 600 of sending capability requests to a device. In an illustrative embodiment, the method 600 may be performed by the system 100 of FIG. 1 and illustrated with reference to FIGS. 2-4.

The method 600 may include sending, from a first electronic device during a first time period, a first capability request to a second electronic device based on a first schedule, where the first schedule is based on a first behavior pattern of the second electronic device, at 602. For example, in FIG. 1, the first electronic device 122 may send a first capability request 126 to the second electronic device 152 based on a first schedule. The first schedule may be based on the behavior pattern data 136.

The method 600 may also include sending, from the first electronic device during a second time period, a second capability request to the second electronic device based on a second schedule, at 604. The first schedule is determined based on whether the first behavior pattern indicates that a first number of location changes of the second electronic device during a first measurement time period is above a threshold and the second schedule is determined based on whether the second behavior pattern indicates that a second number of location changes of the second electronic device during a second measurement time period is equal to or below the threshold. The second time period is different from the first time period. For example, in FIG. 1, the behavior pattern data 136 may indicate that a number (e.g., 7) of location changes of the second electronic device 152 during a first measurement time period (e.g., weekday evenings during a particular week) is above a threshold (e.g., 5) and the behavior pattern data 138 may indicate that a number (e.g., 2) of location changes of the second electronic device 152 during a second measurement time period (e.g., weekday afternoons during the particular week) is below the threshold (i.e., 5). Based on the behavior pattern data 136, the first schedule may indicate that the first capability request 126 is to be sent periodically with a first frequency (e.g., once every 10 minutes) during a first time period (e.g., weekday evenings). Based on the behavior pattern data 138, the second schedule may indicate that the second capability request 128 is to be sent periodically with a second frequency (e.g., once an hour) during a second time period (e.g., weekday afternoons). Thus, a schedule may indicate that a capability request is to be sent at a higher frequency if a behavior pattern indicates that a number of location changes of a device is above a threshold and at a lower frequency if a behavior pattern indicates that the number of location changes of the device is below the threshold.

Figure 7:
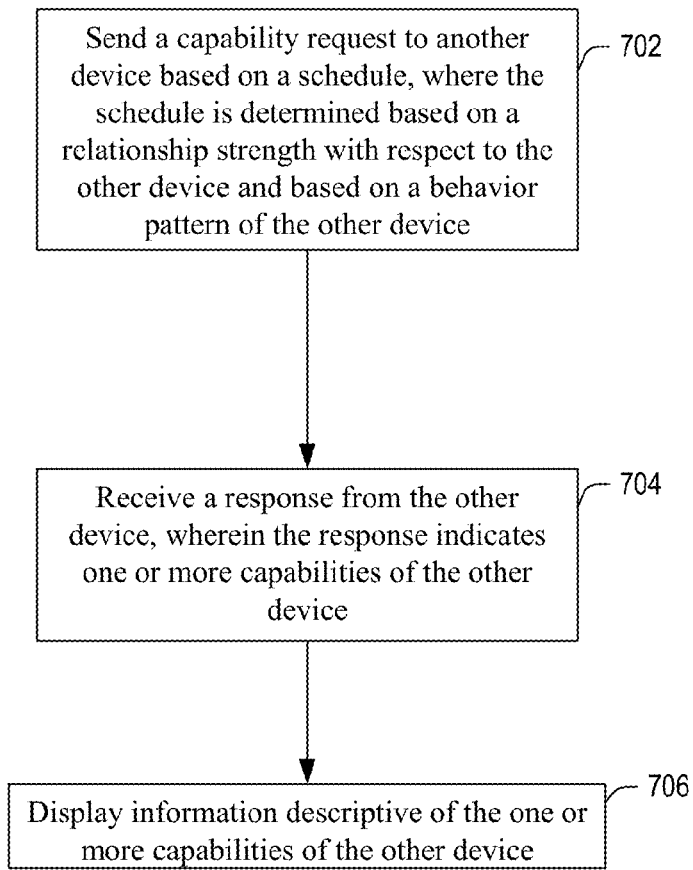
FIG. 7 is a flowchart to illustrate another particular embodiment of a method of sending capability requests to a device.

FIG. 7 is a flowchart to illustrate another particular embodiment of a method 700 of sending capability requests to a device. In an illustrative embodiment, the method 700 may be performed by the system 100 of FIG. 1 and illustrated with reference to FIGS. 2-4.

The method 700 may include sending a capability request to another device based on a schedule, where the schedule is determined based on a relationship strength with respect to the other device and based on a behavior pattern of the other device, at 702. For example, in FIG. 1, a relationship strength (e.g., 12) associated with the second electronic device 152 may indicate that 12 capability requests should be sent to the second electronic device 152 per day. In addition, the behavior pattern data 136 associated with the second electronic device 152 may indicate that a number of times that the second electronic device 152 changed location is above a threshold during a first measurement time period (e.g., weekday evenings of a particular week) and below the threshold during a second measurement time period (e.g., weekend afternoons of the particular week). In a particular embodiment, a total number (i.e., 12) of capability requests that are sent to the second electronic device 152 over a time period may be determined based on the relationship strength and a distribution of the capability requests over the time period may be determined based on the behavior pattern data 136. For example, in FIG. 1, 8 capability requests may be sent to the second electronic device 152 during a weekday evening and 4 capability requests may be sent to the second electronic device 152 over the remaining hours of the weekday.

The method 700 may also include receiving a response from the other device, where the response indicates one or more capabilities of the other device, at 704. For example, in FIG. 1, the first electronic device 122 may receive a response 132 from the second electronic device 152. In a particular embodiment, the response 132 may include capability information of the second electronic device 152. For example, the capability information may indicate whether the second electronic device 152 has device capability for a service, has network support for the service, has a valid subscription for the service, and/or may indicate a willingness of the second user 150 to use the service on the second electronic device 152.

The method 700 may further include displaying information descriptive of the one or more capabilities of the other device, at 706. For example, in FIG. 1, the first electronic device 122 may display capabilities of the second electronic device 152 via a user interface, such as the user interface 400 of FIG. 4. In a particular embodiment, the user interface 400 may display whether the second electronic device 152 has capabilities such as text, voice, video, group chat, internet browsing, high quality voice, file transfer, thumbnail image display of files, delivery notification, location, global positioning system exchange format (GPX), multimedia messaging service (MMS), short message service (SMS), or a combination thereof.

Figure 8:
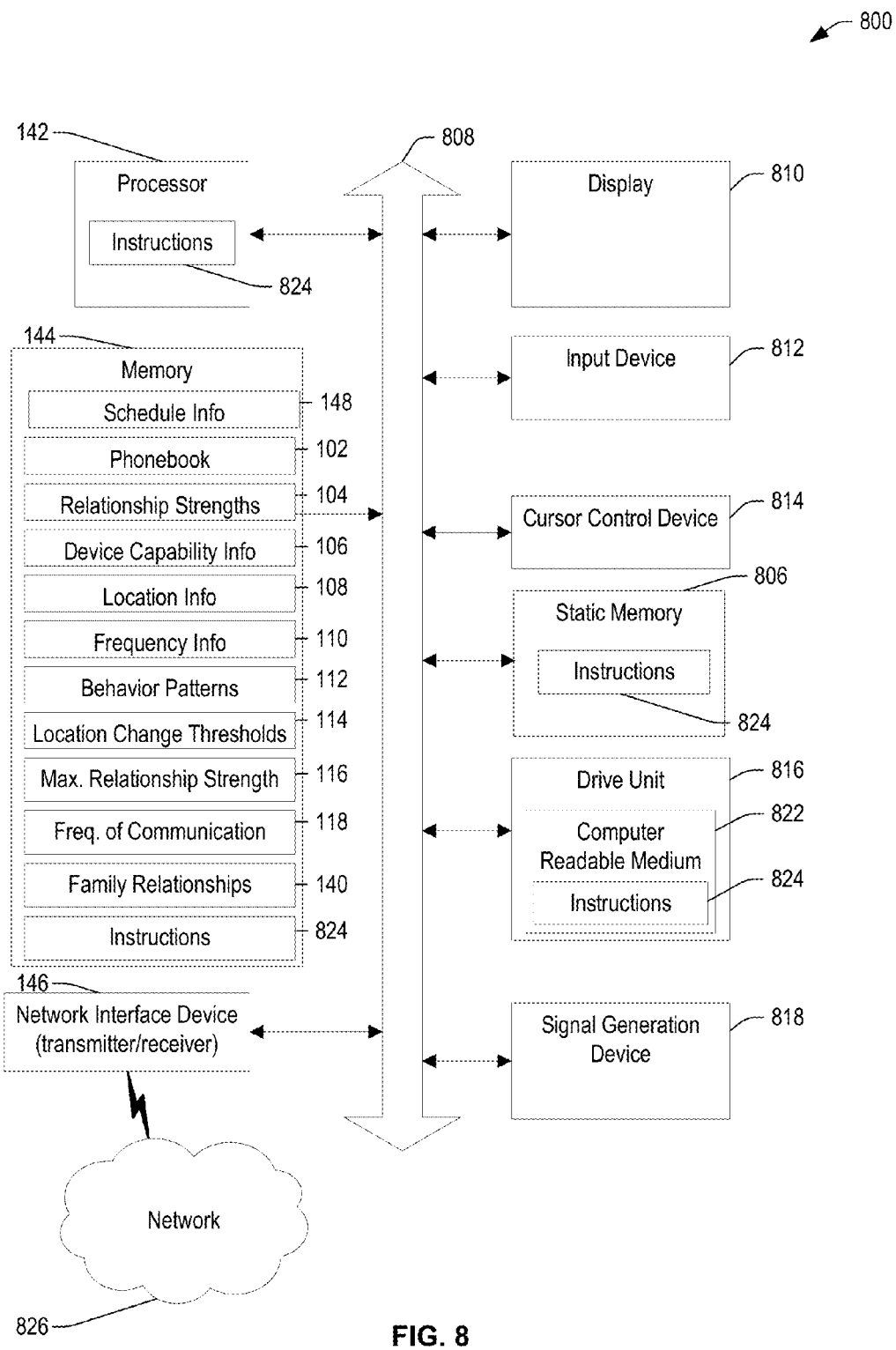
FIG. 8 is a block diagram of an illustrative embodiment of a general computer system operable to support embodiments of computer-implemented methods, computer program products, and system components as illustrated in FIGS. 1-7.

FIG. 8 is a block diagram illustrating an embodiment of a general computer system that is generally designated 800. The computer system 800 may be operable to support embodiments of computer-implemented methods, computer program products, and system components as illustrated in FIGS. 1-7. The computer system 800, or any portion thereof, may operate as a standalone device or may be connected, e.g., using a network, to other computer systems or peripheral devices.

In a networked deployment, the computer system 800 may operate in the capacity of a set-top box device, a personal computing device, a mobile computing device, or some other computing device. The computer system 800 can also be implemented as or incorporated into various devices, such as a personal computer (PC), a tablet PC, a personal digital assistant (PDA), a electronic device, a palmtop computer, a laptop computer, a desktop computer, a communications device, a web appliance, a television or other display device, or any other machine capable of executing a set of instructions (sequential or otherwise) that specify actions to be taken by that machine. In a particular embodiment, the computer system 800 can be implemented using electronic devices that provide voice, video, and/or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include the processor 142 of FIG. 1, e.g., a central processing unit (CPU). Moreover, the computer system 800 may include memory 144 of FIG. 1 and a static memory 806 that may communicate with each other via a bus 808. In a particular embodiment, the memory 144 may include (e.g., as processor-executable instructions) the schedule information 148 of FIG. 1, the phonebook 102 of FIG. 1, the relationship strengths data 104 of FIG. 1, the device capability information 106 of FIG. 1, the location information 108 of FIG. 1, the frequency information 110 of FIG. 1, the behavior patterns data 112 of FIG. 1, the location change thresholds 114 of FIG. 1, the maximum relationship strength 116 of FIG. 1, the frequency of communication data 118 of FIG. 1, and the family relationships data 140 of FIG. 1, or any combination thereof. As shown, the computer system 800 may further include or be coupled to a display unit 810, such as a liquid crystal display (LCD), an organic light emitting diode (OLED), a flat panel display, a solid-state display, or a projection display. Additionally, the computer system 800 may include an input device 812, such as a keyboard, a remote control device, and a cursor control device 814, such as a mouse. In a particular embodiment, the cursor control device 814 may be incorporated into a remote control device. The computer system 800 may also include a disk drive unit 816, a signal generation device 818, such as a speaker, and a network interface device 146. The network interface device 146 may be coupled to other devices (not shown) via a network 826, such as the network 130 of FIG. 1.

One or more of the components of the computer system 800 may be included in a set-top box device, a electronic device (e.g., the first electronic device 122, the second electronic device 152, the third electronic device 162), or a computing device. In a particular embodiment, the set-top box device, the electronic device, or the computing device may include a tangible computer-readable medium in which one or more sets of instructions, e.g., software, may be embedded. Further, the instructions may be executable by a processor to perform one or more of the methods described herein.

In a particular embodiment, as depicted in FIG. 8, the disk drive unit 816 may include a tangible computer-readable medium 822 in which one or more sets of instructions 824, e.g. software, may be embedded. Further, the instructions 824 may embody one or more of the methods or logic as described herein. In a particular embodiment, the instructions 824 may reside completely, or at least partially, within the memory 144, the static memory 806, and/or within the processor 142 during execution by the computer system 800. The memory 144 and the processor 142 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable non-transitory medium that includes instructions 824 so that a device connected to the network 826 can communicate voice, video, or data over the network 826. Further, the instructions 824 may be transmitted or received over the network 826 via the network interface device 146 (e.g., a transmitter, a receiver, a transceiver).

While the computer-readable non-transitory medium is shown to be a single medium, the term "computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   generating a first schedule at a first electronic device associated with a first user, wherein the first schedule is generated based on a first relationship strength of a relationship of the first user and a second user; and
   sending, from the first electronic device to a second electronic device associated with the second user, a first capability request, wherein the first capability request is sent based on the first schedule.

2. The method of claim 1, further comprising:
   receiving, at the first electronic device, a response from the second electronic device, wherein the response indicates a capability of the second electronic device; and
   displaying, at the first electronic device, information descriptive of the capability of the second electronic device.

3. The method of claim 2, wherein the response indicates a format for communication between the first electronic device and the second electronic device.

4. The method of claim 2, wherein the information descriptive of the capability of the second device includes information related to a service that includes text, voice, video, high definition content, group chat, internet browsing, high quality voice, file transfer, thumbnail image display of files, delivery notification, location, global positioning system exchange format, multimedia messaging service, short message service, or a combination thereof.

5. The method of claim 1, further comprising updating the first schedule to a second schedule in response to a change of strength of the relationship from the first relationship strength to a second relationship strength, wherein the first schedule indicates that capability requests are to be sent periodically at a first frequency, and wherein the second schedule indicates that capability requests are to be sent periodically at a second frequency.

6. The method of claim 5, wherein the first frequency is greater than the second frequency and the first relationship strength is greater than the second relationship strength.

7. The method of claim 6, wherein the first frequency is once an hour and the second frequency is once a day.

8. The method of claim 1, further comprising updating the first relationship strength based on user input received at the first electronic device, based on a time period between communications between the first electronic device and the second electronic device, based on a location of the second electronic device, based on a geographic proximity of the first electronic device and the second electronic device, based on a family relationship of the first user and the second user, based on activity of the second electronic device, or based on a combination thereof.

9. The method of claim 1, further comprising:
   generating a second schedule at the first electronic device, wherein the second schedule is generated based on a second relationship strength of a second relationship of the first user and a third user; and
   sending, from the first electronic device to a third electronic device associated with the third user, a second capability request at a time according to the second schedule.

10. The method of claim 1, further comprising:
    generating a second schedule at the first electronic device, wherein the second schedule is generated based on a second relationship strength of a second relationship of the first user and a third electronic device associated with the second user; and
    sending, from the first electronic device to the third electronic device, a second capability request at a time according to the second schedule.

11. The method of claim 1, further comprising sending, from the first electronic device to a third electronic device associated with the second user, a second capability request, wherein the second capability request is sent at a time according to the first schedule.

12. The method of claim 1, wherein the first schedule is further based on activity of the second device, wherein the activity indicates a first period of time during which the second electronic device changed locations more than a threshold number of times, a second period of time during which the second electronic device has changed locations less than the threshold number of times.

13. A computer-readable storage device storing instructions that, when executed by a processor, cause the processor to perform operations comprising:
    sending, from a first electronic device associated with a first user, a first capability request to a second electronic device based on a first schedule, wherein the second electronic device is associated with a second user, and wherein the first schedule is based on a first relationship strength associated with a relationship of the first user and the second user; and
    sending, from the first electronic device, a second capability request to a third electronic device based on a second schedule, wherein the third electronic device is associated with a third user, wherein a second relationship strength is associated with a second relationship of the first user and the third user, wherein the second schedule is based on the second relationship strength, and wherein the second relationship strength is different from the first relationship strength.

14. The computer-readable storage device of claim 13, wherein the operations further comprise:
- receiving a response from the second electronic device, wherein the response indicates a capability of the second electronic device;
- receiving a second response from the third electronic device, wherein the second response indicates a second capability of the third electronic device; and
- storing the capability and the second capability in a memory associated with the first electronic device.

15. The computer-readable storage device of claim 14, wherein the second response indicates a device capability for a service, whether a network associated with the second electronic device supports the service, whether the second electronic device is associated with a valid subscription for the service, or a combination thereof.

16. The computer-readable storage device of claim 13, wherein the first schedule indicates that capability requests are to be sent periodically at a first frequency, and wherein the second schedule indicates that capability requests are to be sent periodically at a second frequency.

17. The computer-readable storage device of claim 16, wherein the first frequency is greater than the second frequency and the first relationship strength is greater than the second relationship strength.

18. A device comprising:
- a processor configured to generate a schedule, wherein the schedule is generated based on a first relationship strength of a relationship of a first user and a second user; and
- a transmitter coupled to the processor and configured to send a capability request to a second device associated with the second user, wherein the capability request is sent based on the schedule.

19. The device of claim 18, wherein the transmitter is configured to send the capability request using a session initiation protocol, an extensible markup language protocol, a hypertext transfer protocol, a universal plug and play protocol, a simple object access protocol, a transmission control protocol, an internet protocol, a wireless fidelity protocol, a simple service discovery protocol, a capability discovery protocol, or a combination thereof.

20. The device of claim 18, wherein the schedule indicates that the capability request is to be sent a first number of times during a first time period, wherein the schedule indicates that the capability request is to be sent a second number of times during a second time period, and wherein the first number of times and the second number of times are different.

* * * * *